United States Patent [19]
Antonetti et al.

[11] 3,992,894
[45] Nov. 23, 1976

[54] INTER-ACTIVE DUAL LOOP COOLING SYSTEM

[75] Inventors: Vincent W. Antonetti, Poughkeepsie; Gordon R. Arent, Wappingers Falls; Omkarath R. Gupta, Poughkeepsie, all of N.Y.

[73] Assignee: International Business Machines Corporation, Armonk, N.Y.

[22] Filed: Dec. 22, 1975

[21] Appl. No.: 643,274

[52] U.S. Cl. .................................. 62/129; 137/558; 165/11;
[51] Int. Cl.² .................. G01K 13/00; E03B/7/07 F16K 37/00; F17D 3/00
[58] Field of Search ...................... 62/125, 129, 130; 137/558; 165/11

[56] References Cited
UNITED STATES PATENTS

| | | | |
|---|---|---|---|
| 2,600,039 | 6/1952 | Whaley, Jr. | 137/558 |
| 3,410,102 | 11/1968 | Karsten | 62/129 |
| 3,415,070 | 12/1968 | Weum | 62/129 |
| 3,491,544 | 1/1970 | Webber | 62/129 |

Primary Examiner—Lloyd L. King
Attorney, Agent, or Firm—Harold H. Sweeney, Jr.

[57] ABSTRACT

A highly reliable fluid cooling system is provided having a first and second cooling loop, each of which is adapted to provide cooling for separate sections of the system to be cooled. Each of the cooling loops is connected to an expansion tank at opposite sides of a partition therein. Crossover piping is provided at the discharge side of the first and second pumps connecting the first loop to the second loop and containing a normally open valve therein. In normal operation, the first pump is adapted for pumping fluid through both the first and second cooling loops via the crossover piping and the common expansion tank. A sensor is provided in each half of the partitioned expansion tank for sensing the drop in fluid level below the partition. Either sensor causes the normally open valve in the crossover piping to close and energizes the second pump so that fluid is circulated in the second loop simultaneously with the circulation of the fluid in the first loop by the first pump, thereby providing a highly reliable dual loop cooling system which acts like one loop during normal operation and automatically separates into two separate loops when a leak is detected.

10 Claims, 8 Drawing Figures

3,992,894

INTER-ACTIVE DUAL LOOP COOLING SYSTEM

STATEMENT OF THE INVENTION

The invention relates to a highly reliable dual loop cooling system and, more particularly, to a dual loop cooling system which acts like one loop having only one pump during normal operation, and which automatically separates into two separate loops each having a separate pump whenever a predetermined amount of leakage is detected, so that the leaking section is isolated while maintaining the rest of the system in operation.

One of the more important efforts in connection with electronic systems, such as computers, has been to increase the availability. One of the factors affecting the availability has been the cooling system used. If the cooling system should fail, the system being cooled must generally be shut down.

One means of improving the availability has been to separate the system to be cooled into separate sections where each section is cooled by a separate cooling system. A failure in any section, due to leakage in the cooling system or a component failure in the system being cooled, will require shut down of only that section and thus the availability is a function of the number of sections formed. This approach to the problem is expensive since an expansion tank, heat exchanger and pump are required for each section. As pumps are added the noise factor correspondingly increases. The pumps are also the most unreliable component in the cooling system. To improve the pump reliability, a redundant pump is usually added to each cooling system, which can be switched in automatically upon the primary pump failure. However, as you increase the availability of the system by dividing it into sections, you are decreasing the reliability by adding the relatively unreliable pumps.

SUMMARY OF THE INVENTION

It is the main object of the present invention to provide a cooling system which improves the availability of the system being cooled while minimizing the decrease in reliability of the cooling system.

It is another object of the present invention to provide a cooling system which normally operates as a single loop system for cooling and which is divided into separate individual cooling loops when liquid leakage is detected.

It is another object of the present invention to provide a cooling system in which the expansion tank is partitioned into sections but operates as a single expansion tank under normal operating conditions and each section operates as an individual expansion tank when leakage is sensed.

It is a further object of the present invention to provide a cooling system in which one pump provides the circulation under normal conditions and a pump per section is utilized when major leakage is sensed.

It is a further object of the present invention to provide a cooling system having more than one cooling loop in which circulation is automatically provided by a single redundant pump when the single primary pump has failed in the absence of detection of a major leak.

It is a further object of the present invention to provide further partitioning and controls for the cooling loop so that it can be divided into smaller cooling loops and the leaking loop can be isolated.

Briefly, a dual loop cooling system is provided having a first and second cooling loop for providing cooling to a first and second section of the unit to be cooled. An expansion tank is common to both the first and second loops and a circulating pump provides the circulation in both loops via crossover piping between the loops. The expansion tank is so partitioned that the expansion tank is common to both loops when the liquid height is normal, and serves as separate expansion tanks for each loop when the liquid level drops below the height of the partition. Sensors located in the expansion tank detect the drop in liquid level below the height of the partition causing a valve in the crossover piping at the output side of the pumps to close, and the second pump to start. Thus, two separate cooling loops are provided so that the leaking section is isolated and only half the system need be shut down.

The foregoing and other objects, features and advantages of the invention will be apparent from the following more particular description of a preferred embodiment of the invention, as illustrated in the accompanying drawings.

DETAILED DESCRIPTION

Figure 1:
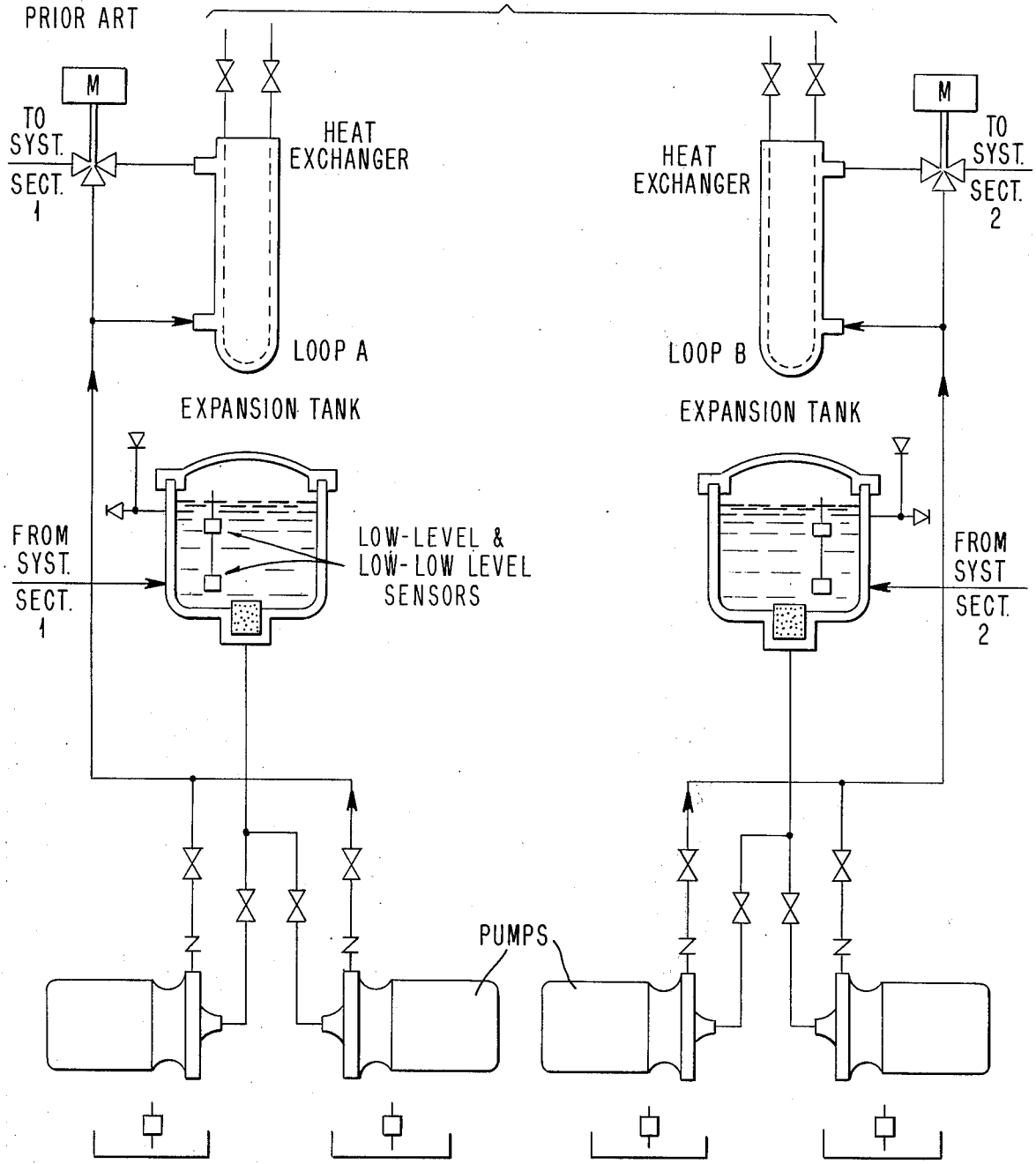
FIG. 1 is a schematic diagram of the prior art dual loop cooling system.

Referring to FIG. 1, there is shown the prior art dual-loop cooling system for providing cooling to sections 1 and 2 of a system to be cooled. Each loop A and B includes a pump which draws the liquid from a separate expansion tank and circulates the fluid through the heat exchanger, from whence it goes to the system to be cooled. The system return goes to the respective expansion tank to complete the circulating loop. The expansion tank has low-level and low-low-level sensors therein to provide signals dependent on the liquid level therein. In order to provide better cooling system reliability, a redundant pump is included for each loop which takes over the pumping action in case of the operating pump failure. It should be appreciated, that the availability of such a system is good in that only the loop containing a leak is shut down rather than both cooling loops. However, such a cooling system requires two expansion tanks and two pumps to be operating at all times, one for each cooling loop, thus providing the noise of two pumps and increasing the possibility of a pump failure.

Figure 2:
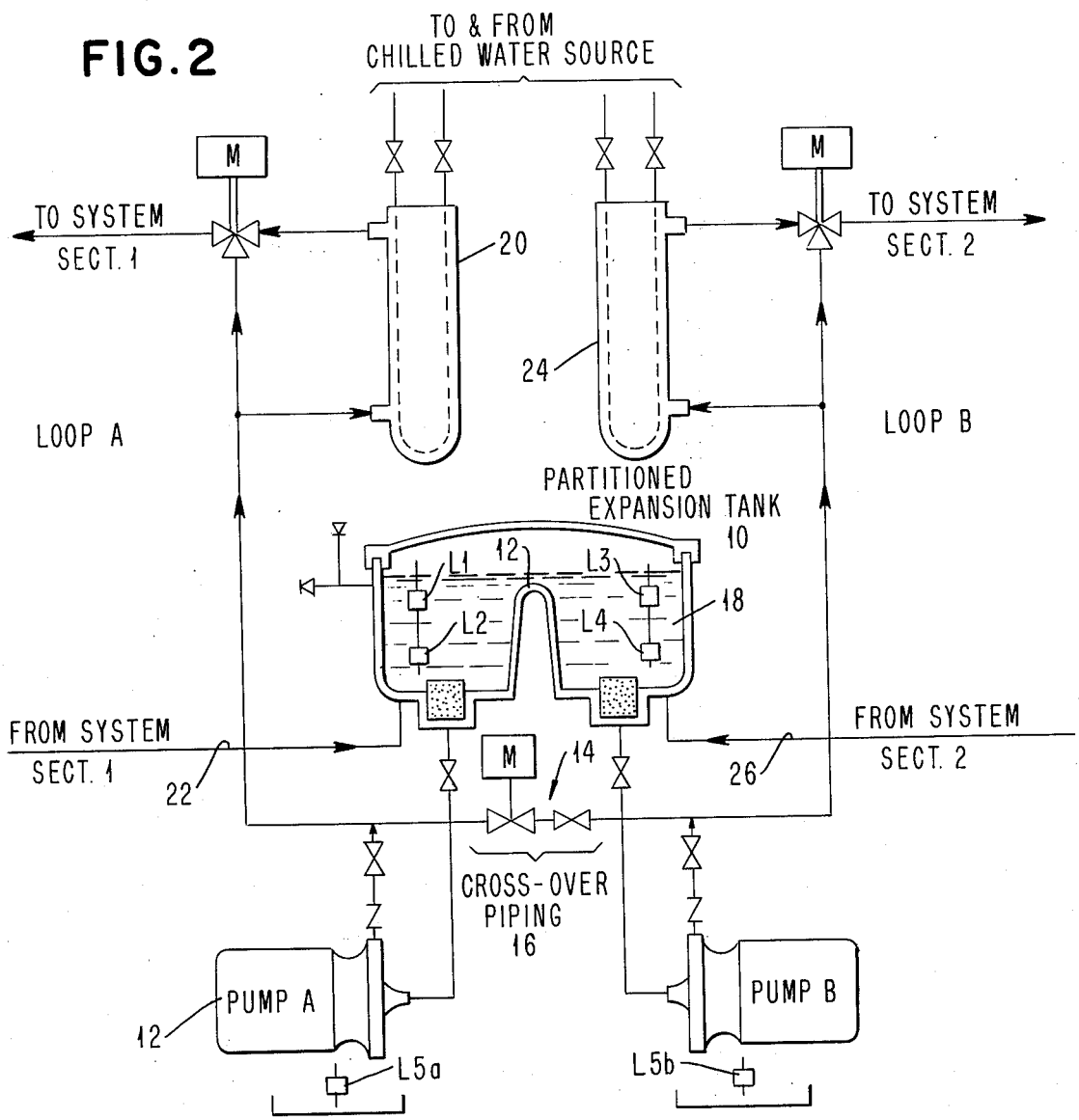
FIG. 2 is a schematic diagram showing the interactive dual loop cooling system of the present invention.

The inter-active dual-loop cooling system of the present invention, as shown in FIG. 2, utilizes a cooling loop A and loop B in an arrangement wherein only one expansion tank 10 is utilized for the two loops and only one pump A is normally in operation with the second pump B providing the reliability through redundancy or vice versa. The expansion tank 10 is built such that a partition 12 is located in the middle thereof, which rises to a height which is below the normal liquid level in the expansion tank. It will be appreciated, that if the liquid level is maintained above the partition 12 in the expansion tank 10, it will operate as a single expansion tank 10. At the outlet side or discharge side of pump A and B, an isolation valve 14 is located in the crossover piping 16. This isolation valve 14 is maintained in the normally open condition. Thus, either one of the pumps A or B circulates the fluid from the expansion tank 10 through its respective pump and into the loops A and B. For example, assuming that pump A is in operation and pump B is not in operation, the pump A circulates the liquid from the expansion tank 10 into loop A and into loop B via the normally open isolation valve 14 in crossover piping 16. The liquid 18, as shown, is circulated through the heat exchanger 20 where the heat is transferred to chilled water, and is circulated to section 1 of the system to be cooled. The return from the system is put into the expansion tank 10 via the return piping 22 which is connected into the lefthand side of the expansion tank 10. Similarly, the liquid in loop B is passed through the heat exchanger 24 where the heat is transferred to the chilled water which is circulating therethrough. The cooled liquid is sent to section 2 of the system and returned from the system via return piping 26 which is connected to the right side of the partitioned expansion tank. The liquid in both loops A and B is circulated by a single pump, thus cutting the noise in half with respect to the usual two pump operation and also cutting the pump failure rate in half.

If a leak should occur in either cooling loop A or B, the liquid level will drop to the top of the partition 12, at which point sensor L1 or L3 will be energized turning off the normally open isolation valve 14 in the crossover piping 16 and starting the other pump. Assuming that pump A is the pump that is on at the time that the liquid level drops to the top of the partition 12, then sensor L1 (or L3) will turn off the normally open isolation valve 14 and start pump B. Thus, we now have two separate loops A and B, since the partition keeps the liquid from both the loops from mixing, one being serviced by pump A and the other being serviced by pump B. If the leakage continues, it will affect one side or the other of the partitioned expansion tank 10, depending on whether the leak is in loop A or in loop B. Assuming that the leak is in loop A, the liquid level will eventually drop to the point where sensor L2 will be energized shutting off pump A so that the leak can be fixed. It will be appreciated, that half the system is still in operation via separate cooling loop B. A similar operation takes place if the leak is in loop B. Sensor L4 will be energized upon the liquid level reaching the predetermined low liquid level height, thereby shutting off pump B so that that half of the system can be serviced. Thus, we have a system which normally operates with one pump, and in the case of a leak operates with two pumps. In the event that the normally operating pump should fail, there is a provision for switching on the redundant pump to handle the system. A pump failure is considered to occur when the pump seal leakage reaches a particular level. This seal leakage is collected and sensors L5a or L5b are provided so that a signal is generated when the predetermined leakage level is reached. This signal obtained from the sensors L5a or L5b can be utilized to turn on the redundant pump, while the initial pump is being replaced or repaired while the whole (electronic) system is operational.

Figure 3:
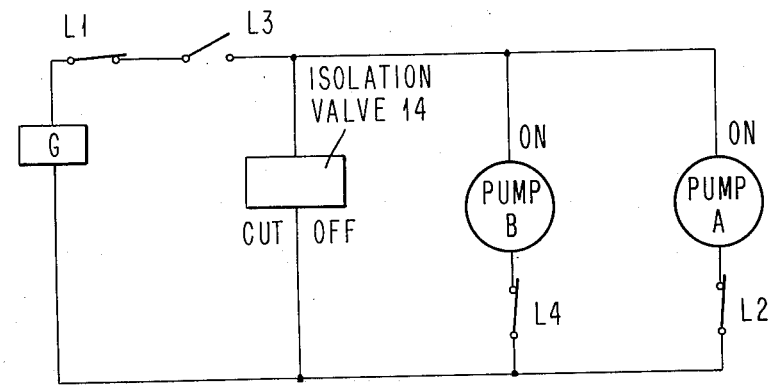
FIG. 3 is a schematic diagram showing the control of the isolation valve and pumps by liquid level sensors L1, L2, L3 and L4.

FIG. 3 shows schematically the operations controlled by the energization of the sensors L1, L2, L3 and L4 in the expansion tank. The figure indicates that either sensor L1 or L3 when opened by the liquid level falling to the height of the sensor, shuts off the isolation valve 14 and turns on the redundant pump A or B. More specifically, FIG. 3 shows L3 open, thereby cutting off isolation valve 14 and turning on the redundant pump. It can also be seen from FIG. 3 that the sensor L2, which is opened when the liquid level in the lefthand partioned section of the tank 10 reaches the level of the sensor, turns off pump A. Similarly, sensor L4 located in the righthand section or partition of the partioned expansion tank 10 turns off pump B when the liquid level reaches the height of the sensor L4.

Figure 4:
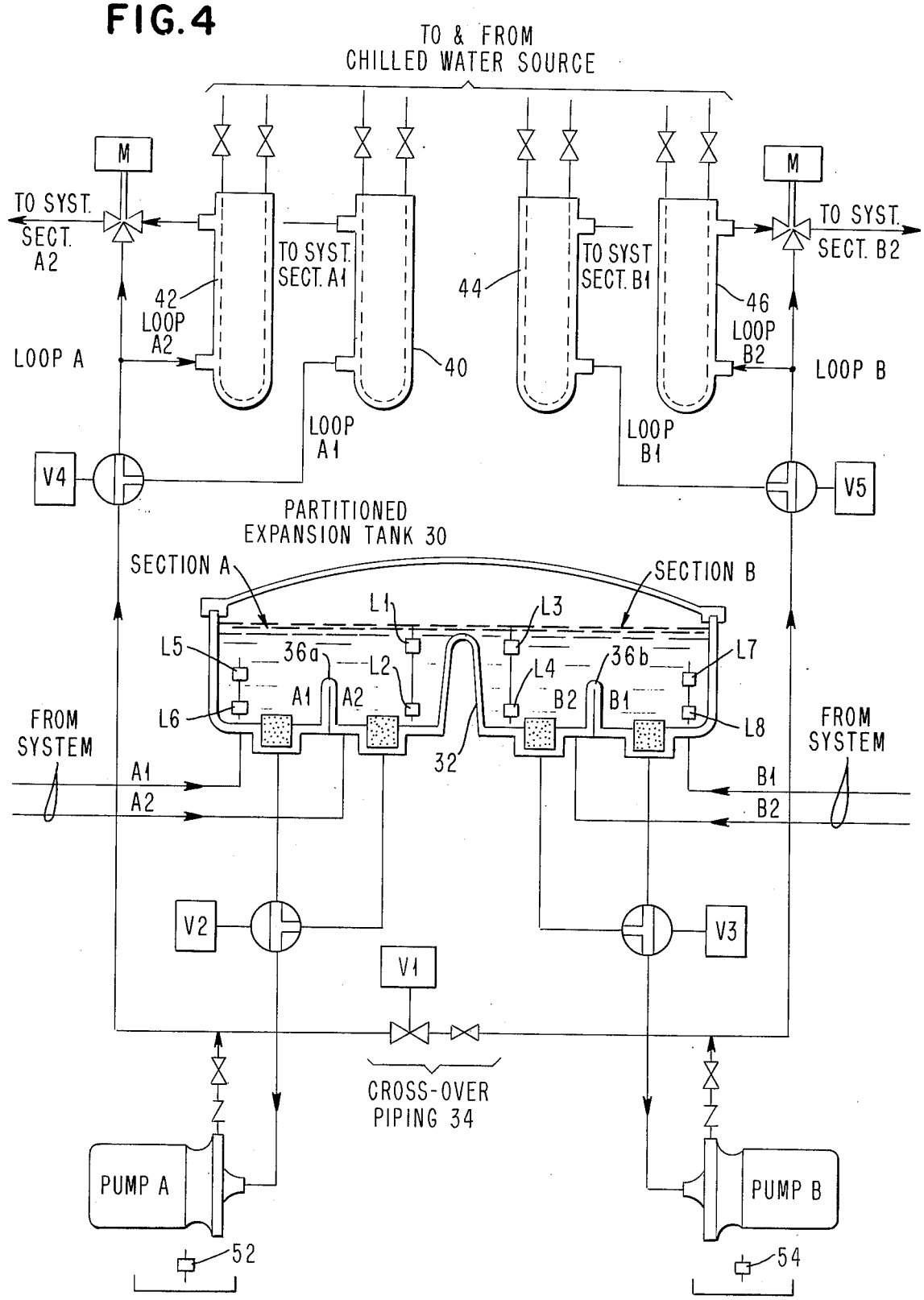
FIG. 4 is a schematic diagram showing the further partitioning of the expansion tank and associated cooling loops.

FIG. 4 shows the inter-active dual-loop cooling system of the invention and in addition shows each of the loops A and B separated into further smaller loops A1, A2 and B1, B2, respectively. These smaller loops are developed by using the novel feature of further partitioning of the expansion tank 30 and a separate heat exchanger per loop. It can be seen, that the partition 32 in the expansion tank 30 dividing the tank into section A and section B and also the liquid level sensors L1, L2 and L3, L4 associated with the respective sections A and B, are identical to the previously disclosed arrangement in FIG. 2. Similarly, the crossover piping 34 and valve V1 along with pumps A and B are identical to the arrangement of FIG. 2. However, the sections A and B of the expansion tank 30 are further divided by means of a partition 35a, 36b, respectively, which reach a height which is lower than the partition 32. Referring to the lefthand side or section A of the partitioned expansion tank 30, it can be seen that as the liquid level drops in section A of the expansion tank 30 due to a leak in loop A, that the liquid level will reach the height of the further partition 36a. At this time, liquid level sensor L5 is operated which turns the power off in the A2 section of the system being cooled. Simultaneously, valve V2 is turned such that the fluid flow from section A2 of the expansion tank to the pump A will be cut off and will be on for section A1. This requires a 180° turn of the valve V2 in a clockwise direction from that shown in FIG. 4. Similarly, valve V4 is adjusted such that the liquid flow will be to the heat exchanger 40 in loop A1 and not to the heat exchanger 42 in loop A2. This will require a 90% clockwise turn of the valve V4 from the position shown in loop A of FIG. 4. If the loop A2 was actually leaking, we have isolated the problem. Thus we have a 50% chance of being right. Under these conditions, 75% of the total machine will continue to function. On the other hand, if the smaller loop A1 was leaking rather than A2, the cooling system goes on functioning until the liquid level drops to the level of sensor L6. Of course, once the liquid level drops to the level of sensor L6, we know that the side A1 was leaking. When the sensor L6 is energized, it turns the power off in the A1 section being cooled. It simultaneously causes valve V2 to turn such that the liquid flow is from the section A2 of the expansion tank to the pump A and is cut-off from section A1. Similarly, valve V4 is turned such that all the flow is to heat exchanger 42 in loop A2 and none to heat exchanger 40 in loop A1. Also, the power is turned on in the section A2 of the system being cooled. Thus, 75% of the cooling and the system to be cooled remains on while the problem is being fixed in the quarter of the machine which is down. Thus, any repairs due to leakage can be fixed while 75% of the machine is operating. It will be appreciated that if the leaks occur between valves V2 and V4 in the loop A, or valves V3 or V5 in loop B, then 50% of the system is shut down.

Figure 5A:
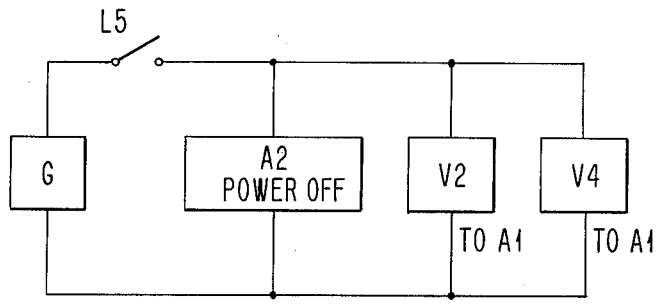
FIGS. 5a, 5b, 5c and 5d are schematic diagrams illustrating the electrical control operations that take place in the multi-loop cooling system of FIG. 4.
Figure 5B:
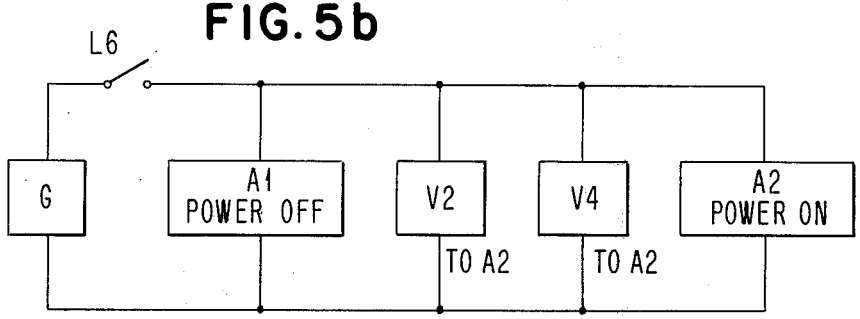
Figure 5C:
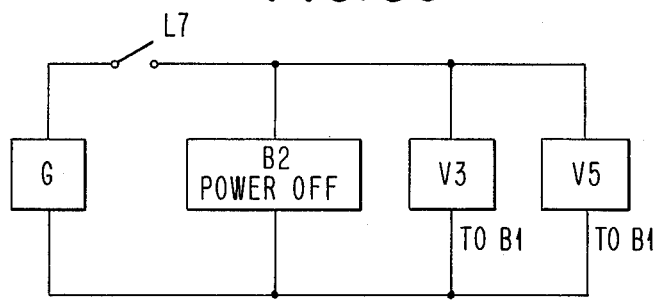
Figure 5D:
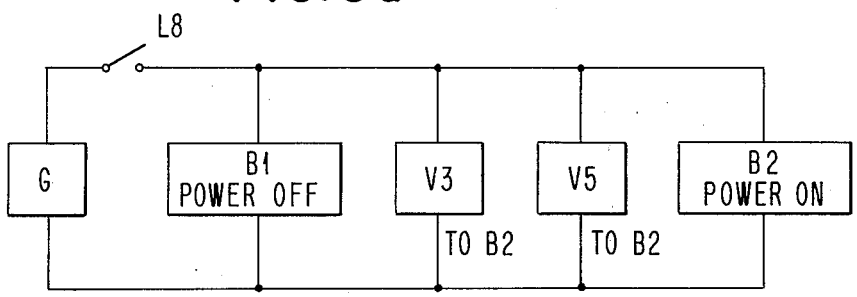

The operation with respect to loop B is the same as the operation of loop A. Initially, the liquid level is above partition 32 in the expansion tank 30, and pump B is supplying the circulation of liquid for both loops A and B via the normally open isolation valve V1 in the crossover piping 34 at the discharge side of the pumps A and B. If a leak occurs in loop B of the cooling system, the liquid level in the entire expansion tank 30 will drop until it reaches the top of the partition 32. At this point the liquid level sensor L3 is energized, which turns off the isolation valve V1 and turns on pump A as illustrated in FIG. 3. The separate pumps A and B provide the circulation for the separate loops A and B, respectively. As the liquid level continues to drop because of the leak, it eventually reaches the top of the partition 36b. The liquid level sensor L7 is energized which turns off the power in the B2 section of the system being cooled. Valve V3 is turned so that it provides a liquid connection to the pump B from the section B1 of the expansion tank 30 and cuts off the connection from the B2 section of the tank 30. Similarly, valve V5 is operated to provide a connection to the heat exchanger 44 in loop B1 and no connection to the heat exchanger 46 in loop B2. Thus, we have isolated or shut down the cooling loop B2. This is done on the assumption that the leak is in loop B2. There is a 50% chance that the leak is actually in the loop B2 of the cooling system. If the assumption, that the leak is in loop B2, is wrong, then loop B1 will continue to leak. Eventually, the liquid level in tank section B1 will descend until sensor L8 is energized. The operation of sensor L8, as can be seen from FIG. 5d, turns the power on in system section B2 and turns the power off in system section B1 while, simultaneously, turning the valves V3 to the B2 section of the tank and V5 to the heat exchanger 46 in loop B2, thereby isolating the leaking loop B1. If the leak is between the valves V3 and V5 which is common to both loops B1 and B2, the level in B2 will continue to drop until it reaches the sensor L4. Energization of the sensor L4 shuts off the pump B causing 50% of the system to go down. If the leakage is caused at one of the pumps, it is detected by a seal leak sensor 52, 54 associated therewith. The seal leak sensor prevents the pump from being turned off by the low sensor L2 in section A and sensor L4 in section B of the tank 30.

Thus, during normal operation, the system functions as a conventional recirculating system with two parallel cooling loops. The loops can be broken down into further smaller cooling loops so that leakage can be isolated to these smaller loops. One pump is used to distribute the coolant to both cooling loops via crossover piping at the pump discharge. The system return water enters a common expansion tank and returns to the pump suction. In the event of leakage in the cooling system, the loops are isolated from each other, and function as two independent systems. This is accomplished by a unique partitioned expansion tank design and an automatic isolation valve in the crossover piping assembly. Both pumps are used when the cooling system is operated in this mode.

While the invention has been particularly shown and described with reference to the embodiments thereof, it will be understood by those skilled in the art that the foregoing and other changes in form and detail may be made therein without departing from the spirit and scope of the invention.

What is claimed is:
1. An inter-active dual-loop cooling system comprising:
    a first and second cooling loop for supplying cooled liquid to first and second sections of the system to be cooled,
    an expansion tank connected in said first and second cooling loops;
    means for partitioning said expansion tank so that it is divided into sections which are common to both said first and second cooling loops in normal operation and serves as separate expansion tanks for said first and second cooling loops when a predetermined amount of leakage from one of said first and second cooling loops has occurred;
    a first and second circulating pump associated with said first and second cooling loops;
    crossover piping located between said first and second cooling loops at the output side of said pumps;
    a normally open isolation valve located in said crossover piping for connecting said first and second loops so that one pump can provide circulation to both loops;
    sensing means located in each expansion tank section for responding to a predetermined amount of leakage to produce shut-off of said isolation valve and turn-on of said second pump to provide two separate cooling loops each with its own pump;
    and low level sensing means for responding to a further predetermined amount of leakage to shut down the associated section to be cooled and shut down the circulating pump associated with the respective cooling loop, thereby isolating the leaking cooling loop and maintaining the other cooling loop in operation.
2. An inter-active dual-loop cooling system according to claim 1, wherein said first and second cooling loops each include a first and second heat exchanger, respectively, for giving up the heat accumulated from said unit to be cooled to chilled water circulated therethrough.
3. An inter-active dual-loop cooling system according to claim 1, wherein said means for partitioning said expansion tank includes a partition which extends from the bottom of the expansion tank in the middle thereof to a height below the normal liquid level height thereby providing two sections which act as a common expansion tank when the liquid level is above said partition and two separate acting expansion tanks when the liquid level is below said partition height.
4. An inter-active dual-loop cooling system according to claim 1, wherein said first cooling loop is connected to one section of said partitioned expansion tank and the second loop is connected to the other section of said partitioned expansion tank.
5. An inter-active dual-loop cooling system according to claim 3, wherein said expansion tank has an outlet connected in each section defined by said partition connected to the input side of respective ones of said first and second pumps.
6. An inter-active dual-loop cooling system according to claim 2, wherein said first pump supplies said liquid to be cooled to said first and second heat ex- changers via said crossover piping containing said normally open isolation valve.

7. An inter-active dual-loop cooling system according to claim 3, wherein said sensing means for responding to a predetermined amount of leakage is a liquid level sensor located at the height of said partition within said expansion tank and adapted to respond when the liquid level drops to the height of said partition.

8. An inter-active dual-loop cooling system according to claim 1, wherein said low level sensing means for responding to a further predetermined amount of leakage is a liquid level sensor located at a predetermined height within each of said sections determined by said partitioning means for responding when the liquid level within the respective section drops to that predetermined height.

9. An inter-active dual-loop cooling system according to claim 3, wherein said first and second cooling loops are each further divided into pairs of smaller cooling loops and said partitioned expansion tank contains a further pair of partitions one on either side of said first partition and having a height less than said first partition, thereby dividing said expansion tank into smaller sections, said smaller sections being associated with respective ones of said smaller cooling loops, a further sensing means associated with one of the smaller sections of each partitioned section and located so as to respond when the liquid level reaches the height of said further partition to isolate said cooling loop having the leak into smaller cooling loops thereby isolating the leaking loop.

10. An inter-active dual-loop cooling system according to claim 9, wherein output piping is connected from each of said smaller sections of said expansion tank to said associated pump, a first valve is located in said output piping and is adapted to connect both smaller sections of said partitioned section to the pump input during normal system operation and is controlled by said further sensing means to disconnect said output from one of said smaller sections to said pump, a second valve is located in said associated cooling loop for connecting the output of said pump to one of said pair of heat exchangers in response to said further sensing means thereby isolating one of the further loops in response to liquid leakage therein.

* * * * *